Figure 1:
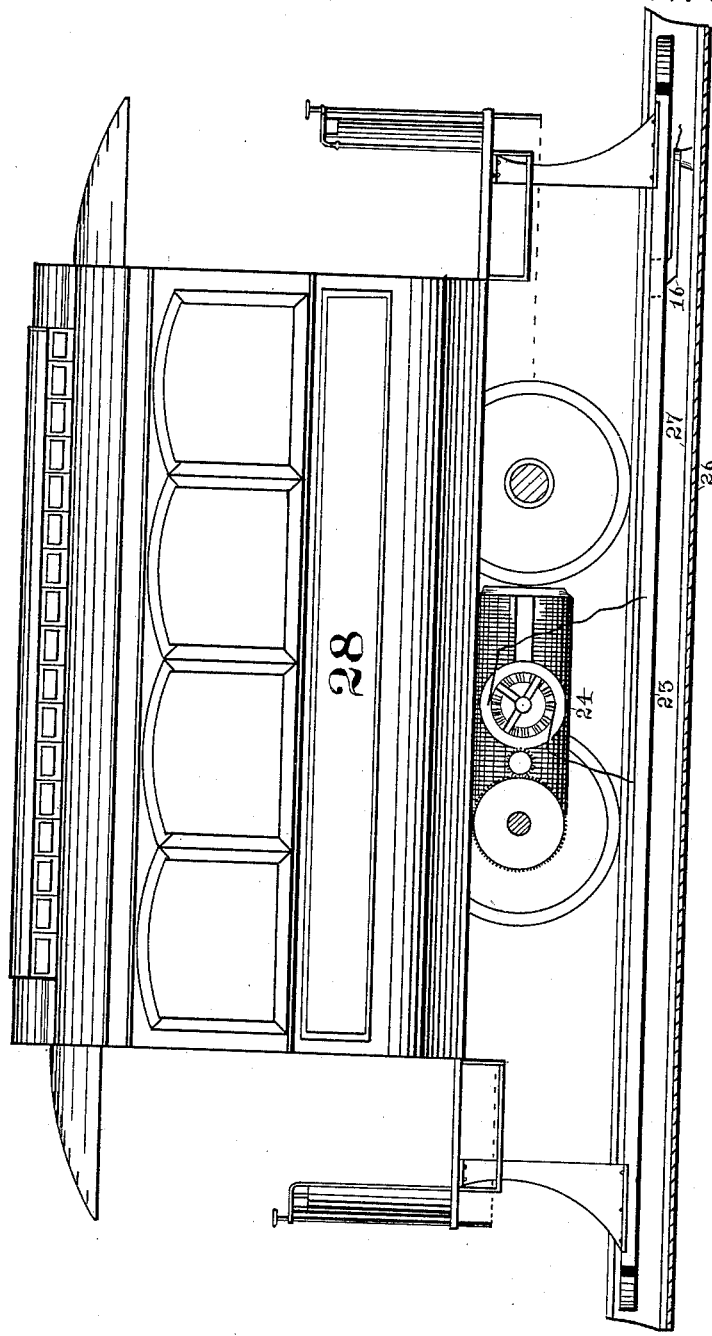

(No Model.)

O. ALLEN.
ELECTRICAL RAILWAY.

No. 392,772. Patented Nov. 13, 1888.

WITNESSES:

INVENTOR.
Orren Allen,
BY
his
ATTORNEY.

(No Model.) 2 Sheets—Sheet 2.
O. ALLEN.
ELECTRICAL RAILWAY.
No. 392,772. Patented Nov. 13, 1888.
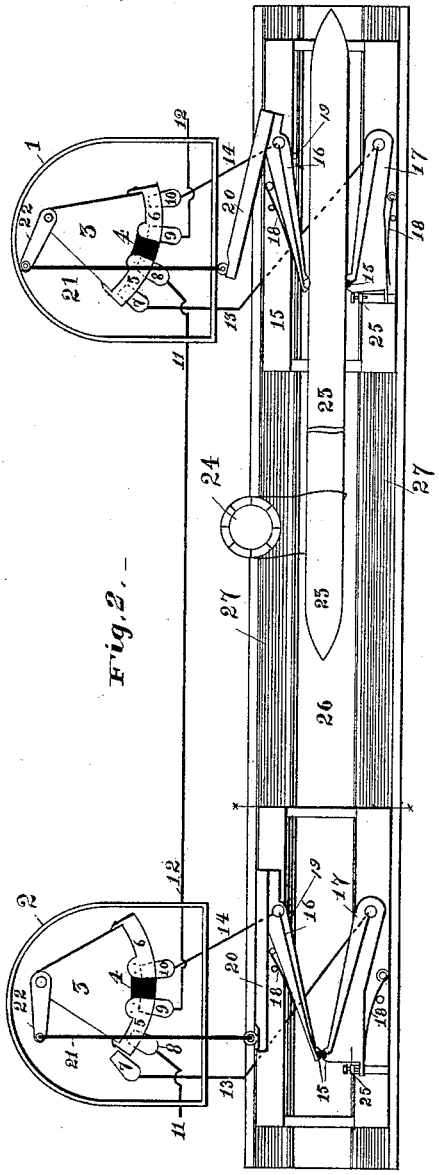
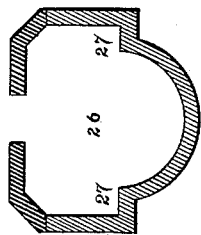
WITNESSES:
C. C. Carlton,
F. F. Wilber
INVENTOR,
Orren Allen,
BY R. W. McDermott
ATTORNEY,
N. PETERS. Photo-Lithographer, Washington, D. C.

UNITED STATES PATENT OFFICE.

ORREN ALLEN, OF DENVER, COLORADO.

ELECTRICAL RAILWAY.

SPECIFICATION forming part of Letters Patent No. 392,772, dated November 13, 1888.

Application filed November 4, 1887. Serial No. 254,255. (No model.)

*To all whom it may concern:*

Be it known that I, ORREN ALLEN, a citizen of the United States, residing at Denver, in the county of Arapahoe and State of Colorado, have invented certain new and useful Improvements in Systems of Electric Railroading and Mechanism Connected Therewith; and I do declare the following to be a full, clear, and exact description of the invention, such as will enable others skilled in the art to which it appertains to make and use the same, reference being had to the accompanying drawings, and to the figures of reference marked thereon, which form a part of this specification.

Of the systems and mechanisms hitherto proposed for the utilization of electricity as a motive power for railway-trains the much greater portion has been based on the employment of low tension and quantity currents in motors arranged in multiple-arc or derived circuits. While in such systems a few cars—say two or three—may be run with some degree of economy, yet they have proved far too expensive to be applied to the running of a number of cars or trains from a single generating and distributing station, it being known that taking, say, ten motors arranged in multiple arc and ten in series the horse-power required in the engine at the generating-station to develop the same speed and move the same weight—other conditions being the same as to both—is about six times greater in the multiple-arc than in a series system. This fact has lately led to several attempts to utilize electricity as the motive power for trains by means of motors arranged in series—that is, to arrange all the motors supplied from one generating and distributing station in a single straight circuit called "series systems." In such systems it has been found essential that the main distributing-circuit should be capable of being broken at intervals, the spaces between such breaks forming sections of the circuit, the sections being normally united by spring circuit-closers. These circuit-closers have been placed in a conduit having a slotted top similar to that used in cable-road systems. In such series systems these spring circuit-closers are always in the circuit and but a few inches from the metal top of the conduit. By means of an "arrow" or "gatherer" traveling in the conduit and carried and impelled by the car they are forced apart and the current switched through the motor attached to such car. In such systems grave difficulties and defects have been found to exist. From the fact that the circuit-closers are always in circuit and directly in the conduit there is opportunity for great leakage, especially in damp weather or when moisture has accumulated in the conduit, and from this leakage of current and the possible charging of the iron top of the conduit danger has resulted to man and beast and accidents thereto have occurred, while, in addition, such leakage involves a wasteful and extravagant consumption of fuel at the generating-station. Again, as the main circuit is positively broken and closed at these circuit-closers in the open-slotted conduit there is often a large amount of "sparking" thereat, which, as the current is necessarily of very high potential when a number of motors are in circuit, projects a flame up through the slot, frightening animals as well as destroying the circuit-closing contacts.

The object of my invention is to avoid these difficulties; to which end it consists in a series system of electrical railroading and mechanism connected therewith, as more fully hereinafter described.

In carrying my invention into practice the devices for shunting the circuit from the main line through the motors upon the cars are entirely removed from the conduit and placed (each set in its own box) in tight, well-insulated, separate, and independent boxes contiguous to the conduit, while in the conduit itself are simply devices normally out of the circuit which, when acted on by the "arrow" or "gatherer," shall, through an intermediate connection, shift the shunting mechanism in the adjacent separate box to switch the current through contacts in the conduit to the motor. In such a system the contacts within the conduit for carrying the current *via* the arrows or gatherers to the motors are normally out of the main circuit, and any one set is only included therein during the brief interval that a car is passing over its section, so that the chance of leakage therefrom is reduced to a minimum, while, the shunting devices for throwing the current from the main line through these contacts to the motors being in separate independent insulated boxes, and the shunting devices preferably embodying the principle of a continuity-preserving key, the chances of leakage from the main line are also reduced to a minimum, if not entirely suppressed.

This system thus generally set forth may perhaps be better understood by reference to the accompanying drawings, in which one embodiment thereof is shown, and in which—

Figure 1 is an elevation of a vehicle, motor, and arrow or gatherer, one side of the conduit and the wheels on one side of the vehicle being removed; Fig. 2, a plan view showing the circuit-connections and with the tops of the conduit and shunting boxes removed. Fig. 3 is a cross-section of the conduit on the line $x\ x$, Fig. 2.

In such drawings, the reference-numerals 1 2 indicate the boxes containing the current-shunting devices, placed at intervals along or contiguous to the conduit 26. These boxes are made of any suitable water-tight material and furnished with covers, so that when the covers are placed in position there may be no ingress for water. The boxes preferably should be lined or coated, or both, with insulating material, while it is essential that at least the operative parts contained in the boxes should be so insulated as to avoid danger of earth-connections.

The circuit-shunting devices contained in each box are of the following description: 3 is an insulated segment pivoted at its angle, and upon whose swinging or curved edge are secured metallic contact-plates 5 6, separated by an insulating-space, 4. 7, 8, 9, and 10 are contact-blocks supported within the box in such position that the segment 3, in swinging or oscillating upon its pivot, will take thereon and cause 5 and 6 to form firm electrical contact therewith. To the segment 3 is secured an arm, 22, which in turn is pivoted to an arm, 21, which extends through the end and out of the box and is pivoted to an arm, 20. Suitable packing devices are placed at the point where 21 passes through the end of the box, so that while a reciprocating movement is permitted to 21 through the aperture the latter is rendered practically water-tight.

Within the conduit 26 and upon suitable ledges or supports, 27, are pivoted, at intervals corresponding with the shunting-boxes 1 2, lever-arms 16 17, of insulating material. Springs 18 act on these arms and force them normally together, while stops 19 and 25 may be provided, limiting the inward movement of the arms. One or both these stops may be adjustable, in this case one, 19, being shown as a mere fixed pin, while the stop 25 is shown as an adjustable-screw in a proper base, against which takes, on its inward movement, a lug or projection from the end of the arm 17, as seen in Fig. 2. Each arm carries at its free end a metallic contact plate or block, 15, for forming electrical contact with the metallic strips on the sides of an arrow or gatherer.

The circuits are arranged as follows: 11 12 are the wires of the single main circuit, connected inside of the shunting-box to the contact-blocks 8 9, respectively, while from contact-blocks 7 10 circuit-connections 13 14 are made via the arms 16 17 to the contacts 15. These connections may be in any one of numerous suitable ways, though as here shown they are insulated wires passing out of the box and into the conduit, where they are secured in grooves in the sides or tops of the arms, their ends being bored and secured to the arms 15.

The normal position of the parts is, as shown, in shunting-box 2 and at the arms in the conduit thereat. In the box 2 the current enters, say, by 11, passes by contact-block 8, strip 5, block 9, and wire 12, there being now a straight circuit through the box, and the contacts 15 in the conduit being kept entirely out of circuit, the only uninsulated portion of the circuit-connections being within the box, which, as before stated, is itself insulated in whole or in part to protect and guard such portions. If now an arrow or gatherer, 23, within the conduit and carried and propelled by a car, 28, carrying a motor, 24, passes between the arms 16 17, the condition is as at box 1. The arms are forced apart and the movement of 16 elevates the outer end of 20, (which is secured to 16,) the motion being communicated to 3 through the arms 21 22, causing block 3 to so swing upon its pivot that strip 5 is caused to contact with blocks 7 and 8, while strip 6 connects 9 and 10. The current now passes via 11 8 5 7 13 to the gatherer or to the metallic strip upon one side thereof, thence to the motor 24 and back to the metallic strip upon the other side of the gatherer, and thence via 16, 14, 10, 6, 9, and 12 to the main circuit again, from whence it was shunted through the contacts in the conduit only while such contacts were acted on by the passing gatherer.

In practice the strips 5 6 and contact-blocks 7, 8, 9, and 10 are of such size and so arranged relatively to each other that 5 connects 7 and 8 and 6 connects 9 and 10 just at or immediately preceding the moment of complete rupture of the connection between 8 and 9 through 5, thus forming a continuity-preserving shunting device, so that the main circuit is never completely broken, but is always closed through one branch or the other, obviating danger of sparking.

It is evident that the practical and successful operation of this system does not depend upon the exact construction of the devices shown, but rather in the peculiar relative relation, arrangement, and co-operation of such or of any equivalent devices, as shown; hence in this application claim is not made to the peculiar mechanical construction of the various parts. For such and for other devices for the same ends separate applications will be made.

Having thus described my invention, what I claim, and desire to secure by Letters Patent of the United States, is—

1. An improved system of electrical railroading, as hereinbefore described, embodying a vehicle, a motor carried by and propelling the vehicle, a main circuit, a conduit, contact-arms located at intervals therein for operating circuit-shunting mechanisms, circuit-shunting mechanisms contained in separate and closed boxes and included in the main circuit and operating to break the main circuit and shunt the current through the motor, and a mechanical connection from a set of contact-arms to a shunting mechanism, substantially as set forth.

2. An improved system of electrical railroading, as hereinbefore described, embodying a vehicle, an electric motor carried by and propelling the vehicle, a main circuit, a conduit, contacts located therein and normally out of the main circuit, shunting mechanisms arranged in separate and independent closed boxes and normally in and controlling the main circuit and adapted to break such main circuit and shunt the current through the motor, and mechanical connections to the shunting mechanisms operated by an arrow or gatherer carried by the vehicle and traveling in the conduit, substantially as set forth.

3. In a system of electric railroading, the combination of a vehicle, a motor carried by and propelling such vehicle, a conduit, contact-arms therein adapted to be moved by the arrow or gatherer traveling therein, a main circuit, and circuit-shunting mechanisms located in the main circuit and arranged in separate independent closed boxes and operated from the contact-arms to break the main circuit and shunt the current through the contacts and the motor only when and while the contacts are operated on by the arrow or gatherer, substantially as set forth.

4. In a system of electrical railroading, the combination of a vehicle, a motor carried by and propelling such vehicle, a conduit, contacts arranged therein at proper intervals and normally out of the main circuit, an arrow or gatherer carried by the vehicle and traveling within the conduit, a main circuit passing normally entirely without the devices in the conduit, a normally-open switch or branch circuit from the main circuit to each set of contact-arms, and a circuit-shunting mechanism in the main circuit at every set of contacts and each arranged in a separate closed box and operated from the contacts by the arrow or gatherer to break the main circuit and shunt the current through the motor at any one set of contacts only while such set is operated on by the arrow or gatherer, substantially as set forth.

5. In a system of electrical railroading, the combination of a vehicle, a motor carried by and propelling such vehicle, a conduit, an arrow or gatherer carried by the vehicle and traveling in such conduit, contact-arms in the conduit normally out of the main circuit and arranged to be moved or acted on by the arrow or gatherer, a main circuit, normally-open branch circuit therefrom, one to each set of contacts, and shunting mechanism, one at each set of contacts and branch circuit, and included in the main circuit and keeping it normally closed and the branch circuit normally open, and having their contacts arranged to close one circuit just as or just before it opens the other circuit, substantially as set forth.

6. The improved system of electrical railroading described, embodying a vehicle, a motor carried by and propelling such vehicle, an arrow or gatherer carried by the vehicle and traveling in a conduit, a conduit, contacts at suitable intervals therein for conveying the current to the arrow or gatherer and the motor, a main circuit, circuit-shunting mechanisms in such main circuit located in separate independent closed boxes, and mechanical connections from the circuit-shunting mechanisms extending outside the inclosing-boxes and operated during the passage of the arrow or gatherer to cause the breaking of the main circuit and the shunting of the current through the contacts and the motor during such passage only, substantially as set forth.

In testimony whereof I affix my signature in presence of two witnesses.

ORREN ALLEN.

Witnesses:
Z. F. WILBER,
S. H. MILLER.